Oct. 7, 1947.  E. L. HARDER ET AL  2,428,566
CONTROL SYSTEM
Filed Dec. 8, 1944  2 Sheets—Sheet 1
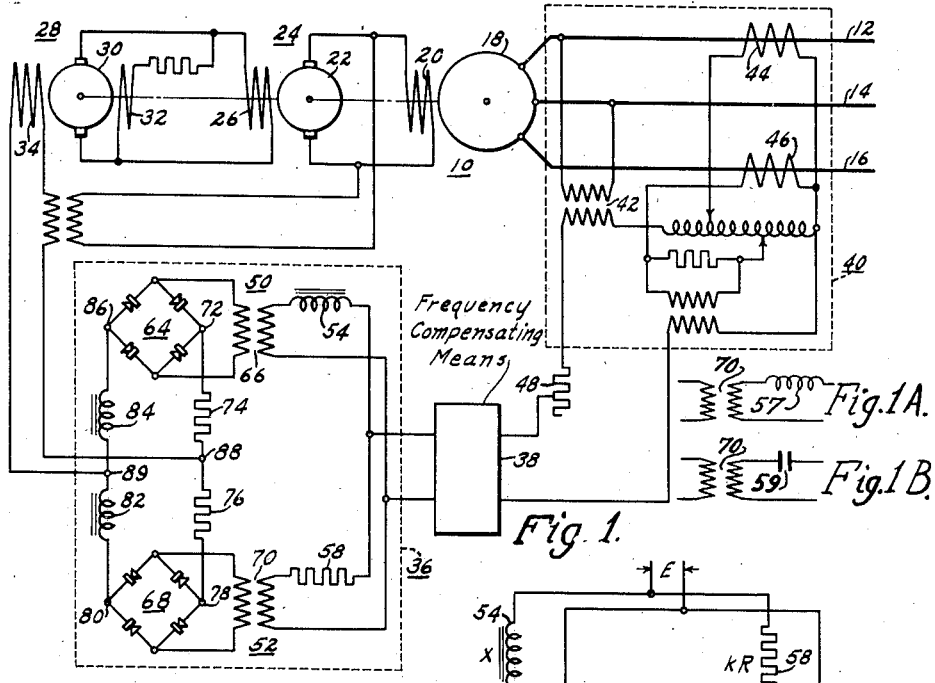
Fig. 1.
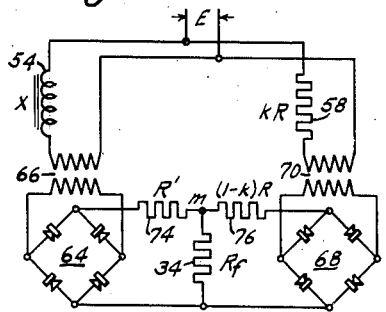
Fig. 3.
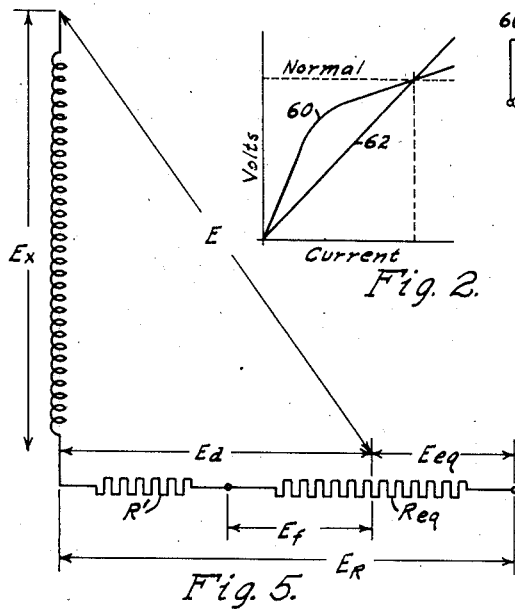
Fig. 2.
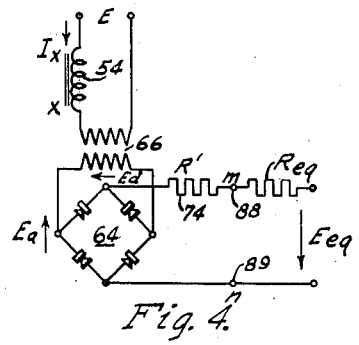
Fig. 4.
Fig. 5.
INVENTORS
Edwin L. Harder and
Homer M. Rustebakke.
BY
James N. Ely
ATTORNEY

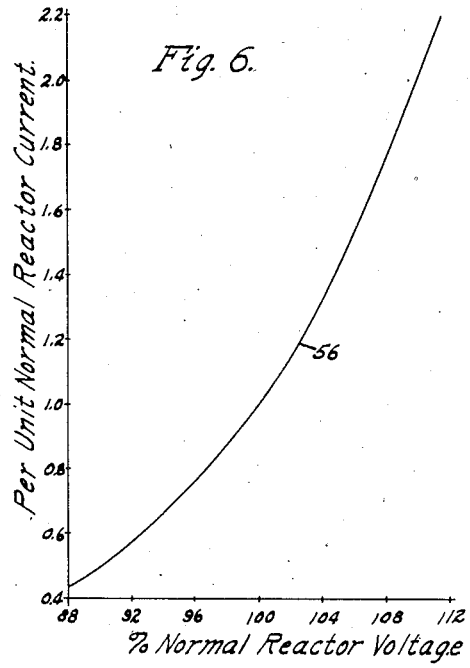
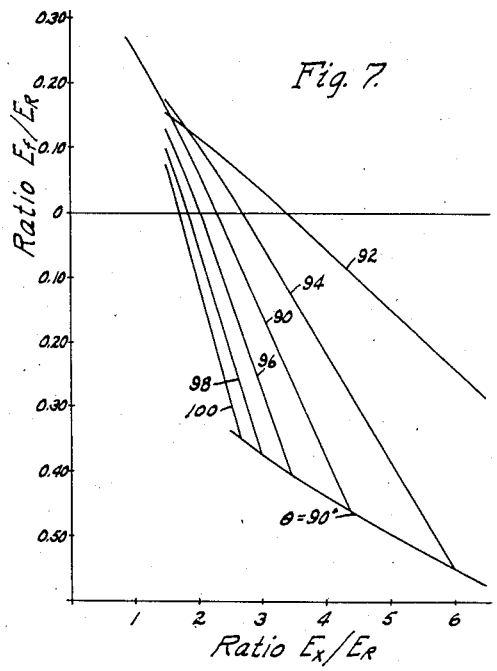
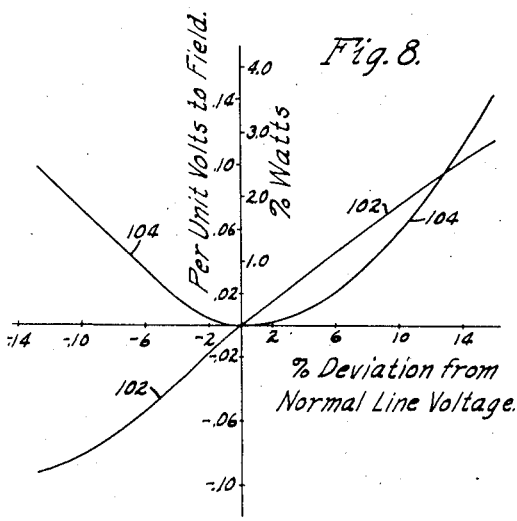
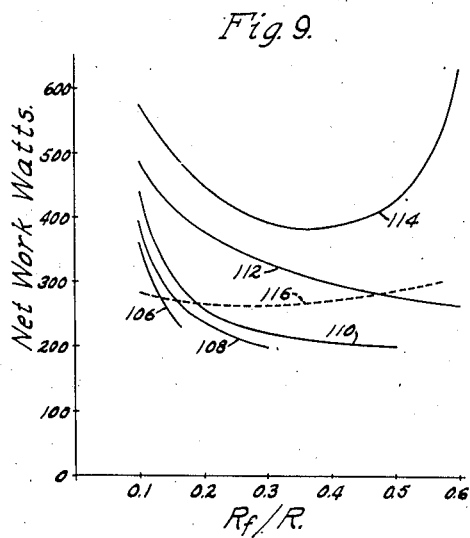
INVENTORS
Edwin L. Harder and
Homer M. Rustebakke.

Patented Oct. 7, 1947

2,428,566

UNITED STATES PATENT OFFICE 2,428,566

CONTROL SYSTEM

Edwin L. Harder and Homer M. Rustebakke, Pittsburgh, Pa., assignors to Westinghouse Electric Corporation, East Pittsburgh, Pa., a corporation of Pennsylvania Application December 8, 1944, Serial No. 567,256

9 Claims. (Cl. 171—119)

This invention relates to regulating systems and, in particular, to the voltage reference networks utilized in regulating systems.

Heretofore, regulating systems have been utilized which embodied networks for discovering any departure from a given electrical quantity, such as line voltage, from normal, and the output of such networks has been amplified to effect a correction in the departure of the electrical quantity. The speed and effectiveness of the regulating system is entirely dependent upon the watts that can be delivered by the network per unit of the electrical quantity, such as line volts, departure from normal.

In general, the networks referred to can be made to deliver more energy by increasing the kilovolt-ampere capacity of each of its parts and drawing more total energy from the alternating-current line. This, of course, is undesirable as the energy requirements soon get beyond the capabilities of standard potential transformer. Instead, it is desired to produce a voltage reference network which has a good efficiency.

In some of the previous networks, a saturating reactor and a linear impedance which draw the same current at a predetermined voltage have been utilized, the impedances having the characteristics that at voltages higher than the predetermined level, the saturating reactor draws more current than the linear impedance, and at a lower voltage level, the linear impedance draws more current than the saturating reactor. Heretofore the current from the saturating reactor was rectified and passed through a resistor, and the current from the linear impedance was rectified and passed through another resistor, the difference in voltage between two resistors being used to initiate a regulating operation to correct for the departure from normal. Such arrangements required the absorption of considerable energy in the two resistors as well as a considerable reduction in the efficiency of the saturating reactor section as a constant voltage device.

An object of this invention is to provide a voltage reference network for a regulating system which is fast operating, easily constructed, and has a high efficiency.

Another object of this invention is to provide a voltage reference network having a predetermined relation between the component parts thereof to obtain a maximum output therefrom for a minimum input, the input varying a minimum amount between the limits of a plus or minus change in the quantity to be regulated.

A further object of this invention is to provide in a regulating system a voltage reference network having a linear impedance circuit, the impedance of which has a predetermined relation to the impedance of a winding utilized in the regulating system for effecting a correction in the quantity to be regulated.

Other objects of this invention will become apparent from the following description when taken in conjunction with the accompanying drawing, in which:

Figure 1 is a diagrammatic representation of a regulating system embodying the apparatus and circuits of this invention;

Fig. 1A is a diagrammatic representation of apparatus utilized in an embodiment of this invention for a part of the apparatus illustrated in Fig. 1;

Fig. 1B is a diagrammatic representation of another embodiment of this invention utilized in place of certain of the apparatus of Fig. 1;

Fig. 2 is a graph, the curves of which represent the characteristics of linear and non-linear impedances;

Fig. 3 is a simplified showing of a part of the system shown in Fig. 1;

Fig. 4 is a simplified showing of the system shown in Fig. 3;

Fig. 5 is a modified representation of the vectorial diagram of the circuit represented in Fig. 4;

Fig. 6 is a representation of the saturation curve of a saturating reactor employed in the system of this invention;

Fig. 7 is a graph, the curves of which represent definite ratios of voltages across parts of the system of this invention for different values of a specific resistor connected in the circuit of Fig. 4;

Fig. 8 is a graph, the curves of which illustrate the change in per unit volts and the change in per cent watts delivered to a control field of a regulating system by the network of this invention in accordance with the per cent deviation from the normal line voltage; and Fig. 9 is a graph, the curves of which represent the power input to the network of this invention in order to obtain a predetermined power input to the control field of the regulating system at a predetermined change in line voltage for different relations of the impedance units of the network.

Referring to Fig. 1, there is illustrated a regulating system utilizing the voltage reference network of this invention. In the figure, a generator 10 is illustrated as supplying a three-phase load circuit represented by conductors 12, 14, and 16. The generator 10 comprises the armature windings 18 and the field windings 20, the field windings being connected across the armature windings 22 of an exciter 24 which is also provided with field windings 26.

In order to provide normal excitation for the exciter and to regulate the output of the generator 10, a regulating generator 28 is employed as illustrated. The regulating generator 28 is provided with an armature winding 30 connected across the field winding 26 of the exciter 24, a self-exciting field winding 32 being connected across the armature winding 30 to provide normal excitation for the regulating generator when the generator 10 is operating to maintain normal line voltage across the load conductors 12, 14, and 16. In addition to the self-exciting winding 32, the regulating generator 28 is also provided with a control field winding 34 which is disposed to be deenergized when the generator 10 is operating to maintain normal line voltage and is directionally energized as the line voltage departs (raises or lowers) from normal to so excite the generator 28 as to correct the excitation of the generator 10 to correct for such departure and maintain the line voltage substantially at its normal value.

As illustrated, the control field winding 34 is connected through a voltage reference network 36 and a frequency compensating means 38 to be supplied by the line voltage, a network 40 being utilized to derive a positive sequence component of the line voltage for supplying a measure of the line voltage.

The network 40 for deriving the positive-sequence component of the line voltage is disclosed and claimed in the copending application of E. L. Harder, Serial No. 560,299, filed October 25, 1944. Without going into a detailed theoretical analysis of the network 40, the network 40 comprises the potential transformer 42 for deriving a single phase of the three-phase line voltage having no zero-sequence voltage-component and current transformers 44 and 46 which cause line current to pass through the impedance in the network in such a manner as to produce a voltage drop substantially corresponding to the negative-sequence line-voltage, and the voltage drop thus resulting is subtracted from the single phase of the line voltage to produce substantially the positive-sequence component of the line-voltage. Other embodiments of the positive-sequence component network 40 are disclosed and claimed in the aforementioned copending application Serial No. 560,299, and may be employed instead of the specific network 40 illustrated in Fig. 1.

An adjustable resistor 48 is connected in the output circuit from the network 40 for providing a voltage adjusting means. The frequency compensating means 38 may be any suitable arrangement of capacitors and inductance apparatus for accomplishing the purpose of compensating for frequency, the details of such compensating means not being illustrated as they form no part of the present invention. As will be appreciated in many cases, the frequency of the line voltage will not fluctuate greatly, and it may not be necessary to utilize the frequency compensating means 38, but instead the positive-sequence component of the line voltage from the network 40 will be supplied directly to the voltage reference network 36.

The voltage reference network 36 in the embodiment illustrated comprises a non-linear impedance circuit 50 and a linear impedance circuit 52 connected to be simultaneously energized in accordance with the line voltage and, in particular, by the positive sequence component of the line voltage. The non-linear impedance circuit includes a saturating reactor 54 having a saturating curve 56 as shown in Fig. 6 of the drawings, whereas the linear impedance circuit 52 illustrated includes a resistor 58. The saturating reactor 54 and the resistor 58 have intersecting impedance characteristics as illustrated by curves 60 and 62, respectively, of Fig. 2 so that as the line voltage varies from normal, such as for a raise in voltage, the saturating reactor 54 draws more current, and at lower voltages the linear impedance 58 draws more current.

The non-linear impedance circuit 50 is connected across a dry type rectifier unit 64 through an insulating transformer 66. The linear impedance circuit 52 is also connected across a dry type rectifier unit 68, an insulating transformer 70 also being utilized in this circuit. The insulating transformers 66 and 70 preferably have a one to one ratio. The output terminals of the rectifier units 64 and 68 are connected in series circuit relation with each other, the terminal 72 of the unit 64 being connected through series connected resistors 74 and 76 to the terminal 78 of the dry type rectifier unit 68 and the terminal 80 of unit 68 being connected through the series connected smoothing reactors 82 and 84 to the output terminal 86 of the dry type rectifier unit 64. The resistor 74 is associated with the rectifier unit 64 and the resistor 76 is associated with the rectifier unit 68, the respective resistors being of a sufficient value that the associated rectifier voltages remain positive for up to 10% deviation in line voltage from normal line voltage. The control field 34 is connected across the direct-current series circuit connecting the dry type rectifier units at points 88 and 89 which at normal line voltage is at zero potential. For an unbalance between the rectifier units, the control field 34 is energized in one or the other directions to effect a change in the excitation of the regulating generator 28.

In practice, it has been found necessary to provide a predetermined relation between the impedance of the control field winding 34 and the impedance of the linear impedance circuit 52 of the network and a definite relation between the impedance of the resistor 74 and the impedance of the linear impedance circuit 52 to obtain a minimum input to the network 36 with a maximum output to the control field 34 while maintaining the reactor rectifier unit 64 positive.

For practical purposes, the network 36 of Fig. 1 may be illustrated as shown in Fig. 3 in which the reactors 82 and 84 are omitted, but their resistance values are included in resistors 76 and 74, respectively, and the resistor 76 is considered as a part of the linear impedance circuit. Also for calculation purposes, the forward resistances of the dry type rectifier units 64 and 68 can be included in the resistors 74 and 76, respectively, for computing the power output of the network, the field winding 34 of the regulating generator 28 being illustrated as the resistor $R_t$ As the network illustrated in Fig. 3 contains alternating-current and direct-current circuits and a non-linear element, it cannot be solved by conventional methods of analysis. For this reason, it is thought that the method of calculating the network should be illustrated in substantial detail, and the line voltage supplied to the network is designated and shown as E, and the reactor 54 is given a value of impedance X. For practical purposes, where the linear impedance element is the resistor 58, the total impedance R of the linear impedance circuit can be considered as composed of the resistor 58 having a resistance $kR$, and the resistor 76 having a resistance $(1-k)R$, the resistor 76 thus having a dual function of maintaining the voltage of the dry type rectifier unit 68 positive and also providing a part of the impedance of the linear impedance circuit.

The voltage reference network shown in Fig. 3 may be further simplified, using Thevenins' Theorem (for reference see Radio Engineering by Terman, McGraw Hill Publication, 2nd ed., 1937, page 95, and Thevenins' Theorem by E. L. Harder, Electric Journal, vol. 35, No. 10, October, 1938, page 397) to the form illustrated in Fig. 4 of the drawing. In this form $R_{eq}$ is the equivalent impedance of the linear impedance circuit of Fig. 3 including that of the field winding 34, and $E_{eq}$ is the equivalent voltage of the linear impedance circuit, these values being expressed according to Thevenins' Theorem as $$R_{eq} = \frac{RR_f}{R + R_f}$$

and $$E_{eq} = \frac{R_f}{R + R_f} E$$

The circuit of Fig. 4 is capable of being represented by a modified vector diagram as shown in Fig. 5 of the drawing, which diagram serves to better illustrate the relationship of the voltages in the network which includes the rectifier. In the form of the circuit shown in Fig. 4, the voltage drop across resistors $R'$ and $R_{eq}$ in series is the numerical sum of the voltages $E_d$ and $E_{eq}$. The voltage $E_d$ is readily obtained from the line voltage $E$ by subtracting the $IX$ drop vectorially from the line voltage $E$. The current $I$ must be in phase with the voltage $E_d$ since the circuit supplied by the transformer 66 is composed of pure resistance and is in phase. Therefore, the drop $IX$ must be at right angles to the voltage $E_d$, and this fixes the form of the modified vector diagram illustrated in Fig. 5.

The reactor 54 has a saturation curve 56 such as is illustrated in Fig. 6 of the drawing. Starting with the current $I_x$, the voltage $E_x$ can readily be determined from the saturation curve 56, and the voltage $E_R$ can be determined by multiplying the current $I_x$ by the resistance $(R + R_{eq})$. The line voltage $E$ is known, and the equivalent voltage $E_{eq}$ (Fig. 5) can be determined as shown in Fig. 5. The field voltage $E_f$ can be determined by letting the angle $\theta$ vary and calculating the ratios of the voltages $$\frac{E_x}{E_R} \text{ and } \frac{E_f}{E_R}$$

for various values of $\theta$. In such calculations, the voltage $E$ can be taken as one since the ratios of the voltages are to be determined and the actual values are immaterial.

In such calculations, the values of the angle $\theta$ are taken from 0° to 90° as the parameter as listed in Table I given hereinafter. In making the calculations, assumed values of the resistor $R'$ and of the field winding $R_f$ are employed and for purposes of illustration, it will be assumed that $R' = .2R$ and $R_f = .3R$.

Referring to the vector diagram of Fig. 5, it is seen that $E_x = E \sin \theta$ and as $E$ is taken as 1 then $$E_x = \sin \theta \quad (1)$$

and $$E_d = E \cos \theta = \cos \theta \quad (2)$$

As stated hereinbefore, according to Thevenins' Theorem $$E_{eq} = \frac{R_f}{R + R_f} E = \frac{R_f}{R + R_f} \quad (3)$$

and $$R_{eq} = \frac{RR_f}{R + R_f} \quad (4)$$

By substituting the assumed value of $R_f$ in Equations 3 and 4, it is found that $E_{eq} = 0.2308$ and $R_{eq} = 0.2308R$.

As viewed, the total voltage $E_R$ across the equivalent resistor $R_{eq}$ and the resistor $R'$ is $$E_R = E_d + E_{eq} = E_d + 0.2308 \quad (5)$$

Then by having $E_x$, Equation 1, and $E_R$, Equation 5, the ratios $$\frac{E_x}{E_R}$$

can readily be computed.

As is evident, the field voltage $E_f$ is a potentiometer fraction of the total voltage $E_R$ minus the equivalent voltage $E_{eq}$ and can be expressed as $$E_f = \frac{R_{eq}}{R' + R_{eq}} E_R - E_{eq} \quad (6)$$

By substituting Equation 4 in Equation 6 and further substituting the assumed values for $R_f$ and $R'$, Equation 6 then becomes $$E_f = .534 E_R - E_{eq} = .534_R - 0.2308 \quad (7)$$

The ratio $$\frac{E_f}{E_R}$$

can then be computed.

As an example of such calculations for the ratios $$\frac{E_f}{E_R} \text{ and } \frac{E_x}{E_R}$$

with the above assumptions as to $E = 1$, $R' = .2R$ and $R_f = .3R$, reference may be had to the following table in which the angle $\theta$ is given for different values ranging from 0° to 90°.

Table I

| $\theta$ | $E_x$ | $E_d$ | $E_R$ | $\frac{E_x}{E_R}$ | $E_f$ | $\frac{E_f}{E_R}$ |
|---|---|---|---|---|---|---|
| 0 | 0 | 1.0000 | 1.2308 | 0 | 0.428 | 0.347 |
| 10 | 0.1736 | 0.9848 | 1.2156 | 0.143 | 0.419 | 0.347 |
| 20 | 0.3420 | 0.9397 | 1.1705 | 0.292 | 0.395 | 0.337 |
| 30 | 0.5000 | 0.8660 | 1.0968 | 0.456 | 0.355 | 0.324 |
| 40 | 0.6428 | 0.7660 | 0.9968 | 0.645 | 0.302 | 0.303 |
| 50 | 0.7660 | 0.6428 | 0.8736 | 0.878 | 0.235 | 0.269 |
| 60 | 0.8660 | 0.5000 | 0.7308 | 1.186 | 0.160 | 0.219 |
| 70 | 0.9397 | 0.3420 | 0.5728 | 1.640 | 0.0752 | 0.131 |
| 80 | 0.9848 | 0.1736 | 0.4044 | 2.432 | −0.0148 | −0.0366 |
| 90 | 1.0000 | 0 | 0.2308 | 4.333 | −0.1076 | −0.466 |

Referring to Fig. 7 of the drawing, there is plotted as curve 90 the ratio of $$\frac{E_x}{E_R}$$

against the ratio $$\frac{E_f}{E_R}$$

as calculated in Table I. Curves 92, 94, 96, 98, and 100 are based on similar calculations (not shown) in the same manner as those calculated and tabulated in Table I for different values of field resistance $R_f$, such as .1R, .2R, .4R, .5R, and .6R, respectively, with R' maintained at .2R.

With the curves 99 through 100 as shown in Fig. 7, it is quite easy to find the value of the field voltage $E_f$ for different regulating generators 28 where the ratios of the impedance of the field winding to the impedance of the linear impedance circuit is known and the impedance of the resistor R' is adjusted to equal .2R, as will be seen hereinafter. Also it is easy to compute the field power $P_f$ if one starts with a given reactor voltage $E_x$ and assumes that for normal line voltage $E_n$ the network 36 is so proportioned that the field power $P_f$ and field voltage $E_f$ are zero.

With the latter assumption, it is required that the network 36 have equal impedances in the two branches up to the points $m$ and $n$ or the points of connecting the field winding 34 across the series circuit or $$R = \sqrt{(R')^2 + X^2} \qquad (8)$$

As the impedance of the reactor branch circuit to the points $m$ and $n$ is composed of R' and X, it necessarily follows that when the two branch circuits are at balance that the reactor voltage is slightly less than the line voltage and $$E_x = \frac{E_{xn}}{\cos \sin^{-1}\left(\frac{R'}{R}\right)}$$

where $E_{xn}$ is the reactor voltage at the balance point for normal line voltage $E_n$. As $E_n = E_x$ then $$E_n = \frac{E_{xn}}{\cos \sin^{-1}\left(\frac{R'}{R}\right)} \qquad (9)$$

and if R' = .2R as assumed hereinbefore and $E_{xn}$ is taken as unity then by substituting in Equation 9 it is seen that $$E_n = 1.02$$

If $E_{xn}$ is taken as unity at 100% normal reactor voltage from curve 56 of Fig. 6, it is seen that the per unit normal reactor current $I_{xn}$ is one. It follows that the reactance $X_n$ also equals unity or one. On this basis it is seen that the resistance $$R = \frac{E_n}{I_{xn}} = 1.02$$

and as R' = .2R and $R_f$ is assumed to be .3R, then R' = 0.204 and $R_f$ = 0.306.

Substituting the numerical unit value of $R_f$ and R in Equation 4, it is then seen that the equivalent resistance $R_{eq}$ is equal to 0.2354. Also $$(R' + R_{eq}) = 0.4394$$

where $R' + R_{eq}$ represents the total resistance of the circuit supplied by the reactor rectifier unit 64 as viewed in Fig. 4.

Having selected a value of reactor voltage $E_x$ and having found the reactor current $I_x$ from curve 56 of Fig. 6, the voltage drop $E_R$ is found from the equation $$E_R = I_x(R' + R_{eq}) \qquad (10)$$

This is apparent as the current $I_x$ flows through the resistance $(R' + R_{eq})$ in series and produces the voltage drop $E_R$. Having the value $E_R$ the ratio of $$\frac{E_x}{E_R}$$

can readily be determined from curve 99 of Fig. 7, and the field voltage $E_f$ can then be calculated from the equation.

$$E_f = E_R\left(\frac{E_f}{E_R}\right) \qquad (11)$$

Again referring to Fig. 5 it is seen that the equivalent voltage $E_{eq}$ equals the voltage on the equivalent resistance $R_{eq}$ minus the field voltage $E_f$. However, since $$E_{eq} = \frac{R_f}{(R + R_f)} E \qquad \text{(see Equation 3)}$$

then the equation for the equivalent voltage $E_{eq}$ can be written as $$\frac{R_f}{R + R_f} E = \frac{R_{eq}}{R' + R_{eq}} E_R - E_f \qquad (12)$$

but since, $$\frac{R_f}{R + R_f} = \frac{R_{eq}}{R} \qquad (13)$$

then by substituting Equation 13 in Equation 12, the voltage E is seen to be $$E = \frac{R}{R' + R_{eq}} E_R - \frac{R}{R_{eq}} E_f \qquad (14)$$

or substituting the numerical unit values of R, R', and $R_{eq}$ as given hereinbefore in Equation 14

$$E = 2.320\ E_R - 4.33\ E_f \qquad (15)$$

which can readily be solved by substituting the values of $E_R$ and $E_f$ calculated as indicated by Equations 10 and 11. Having this value of the voltage E, the per unit line voltage $$\frac{E}{E_n}$$

can then readily be determined as $E_n = 1.02$ according to Equation 9.

The per unit field voltage at that per unit line voltage can also be determined by dividing the field voltage $E_f$ found by solving Equation 11 by the normal line voltage $E_n$.

The power consumed by the control field 34 is expressed by the equation $$P_f = \frac{E_f^2}{R_f} \qquad (16)$$

and since $E_f$ has been found from Equation 11 and $R_f$ is shown to be .304, the power $P_f$ is readily calculated.

The normal power supplied to the network can be expressed by the Equation, $$P_n = E_n I_{xn}\left(\frac{R' + R}{R}\right) \qquad (17)$$

and by substituting the values assumed and calculated hereinbefore it is found that $P_n = 1.224$.

Having this value, the per cent field power or the watts consumed by the field per 100 watts drawn from the line by the voltage reference network 36 can be calculated from the equation $$\text{per cent field power} = \frac{100 P_f}{P_n} \qquad (18)$$

Assuming that it is desired to supply 4 watts input to the field winding, the power input to the network 36 can be calculated from the equation $$\text{network watts} = \frac{400}{\frac{100 P_f}{P_n}} \qquad (19)$$

As illustrative of calculations made on the basis of the equations given hereinbefore, reference may be had to the following Table II, the figures given therein being based on different units of reactor voltages $E_x$.

and this correction factor is squared as the power varies in accordance with the square of the voltage. Thus, the network watts at a 10% drop for

*Table II*

| $E_x$ | $I_x$ (Fig. 6) | $E_R$ | $\frac{E_x}{E_R}$ | $\frac{E_f}{E_R}$ (Fig. 7) | $E_f$ (Col 3 x 5) | $\frac{E_f}{E_n}$ | $E$ | $\frac{E}{E_n}$ | $P_f$ | Per cent Fld. Pow. |
|---|---|---|---|---|---|---|---|---|---|---|
| 0.890 | 0.467 | 0.2054 | 4.33 | −0.466 | −0.0958 |        | 0.890 | 0.872 | 0.0299  | 2.440 |
| 0.915 | 0.555 | 0.2440 | 3.75 | −0.334 | −0.0815 | 0.0800 | 0.920 | 0.902 | 0.0217  | 1.770 |
| 0.950 | 0.707 | 0.3110 | 3.06 | −0.178 | −0.0554 | 0.0538 | 0.961 | 0.942 | 0.0100  | 0.820 |
| 1.000 | 1.000 | 0.4394 | 2.28 | 0      | 0       | 0      | 1.020 | 1.000 | 0       | 0     |
| 1.025 | 1.189 | 0.5225 | 1.960| +0.064 | 0.0334  | 0.0328 | 1.069 | 1.048 | 0.00365 | 0.298 |
| 1.050 | 1.414 | 0.621  | 1.690| +0.119 | 0.0739  | 0.0725 | 1.121 | 1.100 | 0.01785 | 1.458 |
| 1.075 | 1.682 | 0.739  | 1.455| +0.160 | 0.1180  | 0.1160 | 1.188 | 1.163 | 0.0455  | 3.72  |

From Table II curves 102 and 104 of Fig. 8 are drawn, curve 102 illustrating the change in the per unit field voltage $$\frac{E_f}{E_n}$$

for different per cent of deviation from the normal line voltage, and curve 104 illustrating the per cent watt change of the power input to the control field winding for different percentages of deviation from the normal line voltage. After having established the curves 102 and 104, the change in control field voltage and the power input thereto for any given deviation in line voltage can quickly be determined by reference to the curves 102 and 104.

While Table II is based on the assumption that $R'=.2R$ and $R_f=.3R$, similar calculations can be made for different values of $R'$ and $R_f$. Without showing such calculations, reference may be had to Fig. 9 of the drawings in which the watts input to the network 36 necessary for obtaining 4 watts input to the control field 34 are plotted for different values of $R_f$, curves 106, 108, 110, 112, and 114 being representative of the change in watts input for $R'=.1R$, $.15R$, $.2R$, $.25R$, and $.3R$, respectively, with $R_f$ varying from .1R to .6R at a 10% drop in line voltage and curve 116 represents the change in watts input to the network 36 where $R'=.2R$ over the same range of $R_f$ for a 10% rise in line voltage.

From the curves of Fig. 9, it is apparent that with $R'=.2R$ that a low steady input to the network is obtained where $R_f$ ranges from .2R to .4R, the variation of the input to the network between a 10% drop and a 10% rise in line voltage being not unduly large. While the curves indicate that improved power input to the control field can be obtained by reducing R', however, R' cannot be reduced to a value at which the reactor rectifier unit 64 would try to operate negative at a 10% drop in the line voltage. The curves indicate and practical tests have proven that R' should be not less than .2R in order to maintain the voltage of the rectox 64 positive over the range $R_f=.2R$ to $.4R$.

In calculating the network watts, as, for example, at a 10% drop in voltage, it is noted that the ratio $$\frac{E}{E_n}$$

or the per unit line voltage closest to a 10% drop is given as .902. In order to then correctly calculate the network watts at a 10% drop, it is necessary to apply a correction factor to Equation 19 in terms of the ratio $$\frac{E}{E_n}$$

the network described in which $R'=.2R$ and $R_f=.3R$ is found by solving the expression $$\frac{400}{\frac{100P_f}{P_n}}\left[1-\frac{E}{E_n}\right]^2$$

or $$\frac{400}{1.77}\left[\frac{1-.902}{.1}\right]^2 = 226(.96) = 2.7 \text{ watts}$$

The operation of the network having the relation between the component parts as described hereinbefore is believed to be apparent in view of the detail description of the method of calculation explained herein. Now with the network 36 having the preferred relation of impedances connected in the circuit of Fig. 1 and assuming that the generator 10, exciter 24, and regulating generator 28 are driven by any suitable means (not shown) for supplying power at a constant voltage to a load (not shown), the self-excited field winding 32 of the regulating generator 28 is sufficient for so exciting the regulating generator 28 to maintain the output of the exciter 24 sufficient to maintain the excitation of the generator 10 to maintain constant voltage across the line conductors 12, 14, and 16. Under the constant voltage conditions of the line, the positive-sequence network 40 functions to deliver a positive sequence component of the generator voltage to the frequency compensating means 38 and thus to the network 36.

The saturating reactor 54 and the resistor 58 are so selected that when the positive-sequence component of the predetermined line voltage is impressed upon the network 36 that the reactor 54 and the resistor 58 have intersecting impedance characteristics as shown in Fig. 2, so that the voltages across the dry type rectifier units 64 and 68 and, consequently, across the common points 88 and 89 of the network are equal and so balanced that a voltage drop does not appear across the control field 34.

If, however, for any reason the line voltage should change, as, for example, increase, then the positive-sequence component delivered to the network 36 is increased, with the result that the saturating reactor 54 draws more current than the linear impedance or resistor 58, and the output voltages across the dry type rectifier units 64 and 68 are unbalanced. With such an unbalanced condition, the larger potential across the rectifier unit 64 effects a voltage drop across the control field 34 in a direction to oppose the excitation of the field winding 32 to decrease the output from the regulating generator 28 whereby the output of the exciter 24 is also decreased, with the result that the excitation of the generator 10 is so decreased as to return the line voltage to its predetermined normal value.

If, on the other hand, the change in voltage across the line conductors is a decreasing voltage, the resistor 58 of the network 36 draws more current than the saturating reactor 54, and the network is unbalanced to effect a voltage drop across the control field winding 34 in the reverse direction to aid the self-energizing field 32 to increase the excitation of the regulating generator 28, whereby the excitation of the main generator 10 is increased to so increase the voltage across the line conductors as to tend to maintain the line voltage at its predetermined normal value.

In functioning to regulate the excitation of the regulating generator 28 in the manner described, it is apparent from the description of the method of calculating the relative values of the impedances of the control field winding to those of the voltage reference network 36 that a high efficiency is obtained where the voltage reference network 36 has the balanced impedance as described. The input to the voltage reference network 36 varies a small amount between the limits of a 10% drop and a 10% rise in the normal line voltage, but this variation is so small in consideration of the output therefrom to the control field, that for practical purposes it can be ignored.

Although the voltage reference network 36 described hereinbefore has been described on the basis of a resistor being utilized as the linear impedance element 58 in the linear impedance circuit, it is, of course, appreciated that a linear reactor 57 or a capacitor 59, as illustrated in Figs. 1A and 1B, respectively, could be employed in place of the resistor 58. If either a linear reactor 57 or a capacitor 59 is utilized in place of the resistor 58, it is still necessary to employ a resistor 76 in the series circuit of the rectifier units in order to maintain the rectifier voltage positive. The resistor 76 in that case, however, need not be large, but only of sufficient value to maintain the rectifier voltage of the rectifier unit 68 positive.

Where a capacitor 59 is utilized in place of the resistor 58, it is found that the combination of the saturating reactor 54 and the capacitor 59 in parallel therewith offers a high impedance to the alternating-current input with a resulting reduction in current whereby the volt amperes are reduced to a minimum, being much lower than if the resistor 58 or the linear reactor 57 is utilized in the linear impedance circuit of the network. Further, it is found that the power output to the control field 34 is greater where the capacitor 59 is employed in place of the resistor 58, such increase in output being obtained with a simultaneous decrease in input. Also since the resistor 58 is a heat-generating device, it is found that where the capacitor 59 is employed in place of the resistor 58, that the problem of dissipation of heat in the network is greatly overcome. In addition, since the capacitor 59 draws reactive power, it is apparent that there is a saving of power where the capacitor is utilized in place of the resistor 58. As a practical matter, the capacitor 59 is also more serviceable since the capacitors are manufactured as a solid unit and will withstand shock better than resistors, while at the same time occupying less space than an equivalent resistor.

Regardless of whether a resistor, linear reactor, or capacitor is employed as the linear impedance 58, it is apparent from the foregoing description that the network 36 is very efficient, delivering maximum power to the control field winding of the regulating generator for a minimum input of power to the network. This, of course, is only true where the relationship of the impedance of the control field winding to the linear impedance circuit of the network and the ratio of the impedance of the resistor 74 to the impedance of the linear impedance circuit is maintained substantially in the proportions described. The network is quite simple in construction, being composed of standard elements and requires a minimum of maintenance in service. It is apparent that the network can be employed with many different types of regulating generators or regulating equipment where the impedance of the control field winding is known by merely making adjustments in the impedance values of the elements of the network to come within the proportions given hereinbefore.

We claim as our invention:

1. In a regulating system for maintaining an electrical quantity substantially constant, in combination, a network disposed to be energized in accordance with the electrical quantity and responsive to variations therein to produce a directional output from the network, the network comprising a non-linear impedance circuit and a linear impedance circuit disposed to be simultaneously energized in accordance with the electrical quantity, a dry type rectifier unit connected to be supplied by the non-linear impedance circuit, another dry type rectifier unit connected to be supplied by the linear impedance circuit, the rectifier units having output terminals connected in series circuit relation with each other whereby a circulating current flows therethrough, a smoothing reactor for each of the rectifier units, the smoothing reactors being connected in the series circuit of the rectifier units, a resistor associated with each rectifier unit and connected in the series circuit therebetween to maintain the polarity of the rectifier units, and means having a predetermined impedance connected across the series circuit between the dry type rectifier units intermediate the smoothing reactors and the polarity maintaining resistors disposed to be directionally energized in response to an unbalanced potential across the output terminals thereof for regulating the electrical quantity.

2. In a regulating system for maintaining an electrical quantity substantially constant, in combination, a network disposed to be energized in accordance with the electrical quantity and responsive to variations therein to produce a directional output from the network, the network comprising a non-linear impedance circuit and a linear impedance circuit disposed to be simultaneously energized in accordance with the electrical quantity, a dry type rectifier unit connected to be supplied by the non-linear impedance circuit, another dry type rectifier unit connected to be supplied by the linear impedance circuit, the rectifier unit, having output terminals connected in series circuit relation with each other whereby a circulating current flows therethrough, and electrical means so connected in circuit relation with the series connected dry type rectifier units as to be directionally energized in response to an unbalanced potential across the output terminals thereof for regulating the electrical quantity, the electrical means having an impedance ranging from .2 to .4 times the impedance of the linear impedance circuit.

3. In a regulating system for maintaining an electrical quantity substantially constant, in combination, a network disposed to be energized in accordance with the electrical quantity and responsive to variations therein to produce a directional output from the network, the network comprising a non-linear impedance circuit and a linear impedance circuit disposed to be simultaneously energized in accordance with the electrical quantity, a dry type rectifier unit connected to be supplied by the non-linear impedance circuit, another dry type rectifier unit connected to be supplied by the linear impedance circuit, the rectifier units having output terminals connected in series circuit relation with each other whereby a circulating current flows therethrough, a smoothing reactor for each of the dry type rectifier units, the smoothing reactors being connected in the series circuit of the rectifier units, and electrical means connected across the series circuit between the dry type rectifier units disposed to be directionally energized in response to an unbalanced potential across the output terminals thereof for regulating the electrical quantity, the electrical means having an impedance ranging from .2 to .4 times the impedance of the linear impedance circuit.

4. In a regulating system for maintaining an electrical quantity having a positive sequence component substantially constant, in combination, a network disposed to be energized in accordance with the positive sequence component of the electrical quantity and responsive to variations therein to produce a directional output from the network, the network comprising a non-linear impedance circuit and a linear impedance circuit having intersecting impedance characteristics at a predetermined level of the positive sequence component, the impedance circuits being connected to be simultaneously energized in accordance with the positive sequence component of the electrical quantity, the non-linear impedance comprising a saturating reactor, the linear impedance comprising at least one selected from the group of a resistor, a non-saturating reactor, and a capacitor, a dry type rectifier unit connected to be supplied by the non-linear impedance circuit, another dry type rectifier unit connected to be supplied by the linear impedance circuit, the rectifier units having output terminals connected in series circuit relation with each other whereby a circulating current flows therethrough, a resistor associated with each rectifier unit and connected in the series circuit therebetween to maintain the polarity of the rectifier units, and means having a predetermined impedance connected across the series circuit intermediate the polarity maintaining resistors disposed to be directionally energized in response to an unbalanced potential across the output terminals thereof for regulating the electrical quantity to maintain the positive sequence component at the predetermined level.

5. In a regulating system for maintaining an electrical quantity having a positive sequence component substantially constant, in combination, a network disposed to be energized in accordance with the positive sequence component of the electrical quantity and responsive to variations therein to produce a directional output from the network, the network comprising a non-linear impedance circuit and a linear impedance circuit disposed to be simultaneously energized in accordance with the electrical quantity, the non-linear impedance comprising a saturating reactor, the linear impedance comprising at least one selected from the group of a resistor, a non-saturating reactor, and a capacitor, a dry type rectifier unit connected to be supplied by the non-linear impedance circuit, another dry type rectifier unit connected to be supplied by the linear impedance circuit, the rectifier units having output terminals connected in series circuit relation with each other whereby a circulating current flows therethrough, a resistor associated with each rectifier unit and connected in the series circuit therebetween to maintain the polarity of the rectifier units, and electrical means connected across the series circuit intermediate the polarity maintaining resistors disposed to be directionally energized in response to an unbalanced potential across the output terminals thereof as the positive sequence component departs from the predetermined level for regulating the electrical quantity, the electrical means having an impedance ranging from .2 to .4 times the impedance of the linear impedance circuit.

6. In a regulating system for maintaining an electrical quantity substantially constant, in combination, a network disposed to be energized in accordance with the electrical quantity and responsive to variations therein to produce a directional output from the network, the network comprising a non-linear impedance circuit and a linear impedance circuit disposed to be simultaneously energized in accordance with the electrical quantity, a dry type rectifier unit connected to be supplied by the non-linear impedance circuit, another dry type rectifier unit connected to be supplied by the linear impedance circuit, the rectifier units having output terminals connected in series circuit relation with each other whereby a circulating current flows therethrough, an impedance consisting of a resistor connected in the output series circuit of the dry type rectifier unit supplied by the non-linear impedance circuit to maintain the polarity thereof, a resistor connected in the output series circuit of the dry type rectifier unit supplied by the linear impedance circuit to maintain the polarity thereof, and electrical means connected across the series circuit intermediate the polarity maintaining resistors disposed to be directionally energized in response to an unbalance of the potentials across the output terminals of the rectifier units for regulating the electrical quantity, the electrical means having an impedance ranging from .2 to .4 times the impedance of the linear impedance circuit when the polarity maintaining impedance of the rectifier unit supplied by the non-linear impedance circuit is substantially equal to .2 times the impedance of the linear impedance circuit.

7. In a regulating system for maintaining an electrical quantity substantially constant, in combination, a network disposed to be energized in accordance with the electrical quantity and responsive to variations therein to produce a directional output from the network, the network comprising a non-linear impedance circuit and a linear impedance circuit disposed to be simultaneously energized in accordance with the electrical quantity, a dry type rectifier unit connected to be supplied by the non-linear impedance circuit, another dry type rectifier unit connected to be supplied by the linear impedance circuit, the rectifier units having output terminals connected in series circuit relation with each other whereby a circulating current flows therethrough, an impedance consisting of a resistor connected in the output series circuit of the dry type rectifier unit supplied by the non-linear impedance circuit to maintain the polarity thereof, a resistor connected in the output series circuit of the dry type rectifier unit supplied by the linear impedance circuit to maintain the polarity thereof, a pair of smoothing reactors connected in series in the series circuit between the rectifier units, and electrical means connected across the series circuit intermediate the polarity maintaining resistors and the series connected smoothing reactors disposed to be directionally energized in response to an unbalance of the potentials across the output terminals of the rectifier units for regulating the electrical quantity, the electrical means having an impedance ranging from .2 to .4 times the impedance of the linear impedance circuit when the impedance of the output circuit of the dry type rectifier unit supplied by the non-linear impedance circuit is substantially equal to .2 times the impedance of the linear impedance circuit.

8. In a regulating system for maintaining an electrical quantity substantially constant, in combination, a network disposed to be energized in accordance with the electrical quantity and responsive to variations therein to produce a directional output from the network, the network comprising a non-linear impedance circuit and a linear impedance circuit disposed to be simultaneously energized in accordance with the electrical quantity and having intersecting impedance characteristics at a predetermined level of a measure of the electrical quantity, the non-linear impedance comprising a saturating reactor, the linear impedance comprising at least one selected from the group of a resistor, a non-saturating reactor, and a capacitor, a dry-type rectifier unit connected to be supplied by the non-linear impedance circuit, another dry-type rectifier unit connected to be supplied by the linear impedance circuit, the rectifier units having output terminals connected in series circuit relation with each other whereby a circulating current flows therethrough, a resistor associated with each of the dry type rectifier units and connected in series circuit therebetween to maintain the polarity of the rectifier units, and means having a predetermined impedance connected across the series circuit of the rectifiers intermediate the polarity maintaining resistors disposed to be directionally energized in response to an unbalanced potential across the output terminals thereof for regulating the electrical quantity.

9. In a regulating system for maintaining an electrical quantity substantially constant, in combination, a network disposed to be energized in accordance with the electrical quantity and responsive to variations therein to produce a directional output from the network, the network comprising a non-linear impedance circuit and a linear impedance circuit disposed to be simultaneously energized in accordance with the electrical quantity and having intersecting impedance characteristics at a predetermined level of a measure of the electrical quantity, the non-linear impedance comprising a saturating reactor, the linear impedance comprising at least one selected from the group of a resistor, a non-saturating reactor, and a capacitor, a dry-type rectifier unit connected to be supplied by the non-linear impedance circuit, another dry-type rectifier unit connected to be supplied by the linear impedance circuit, the rectifier units having output terminals connected in series circuit relation with each other whereby a circulating current flows therethrough, a resistor associated with each of the dry type rectifier units and connected in series circuit therebetween to maintain the polarity of the rectifier units, and means having a predetermined impedance connected across the series circuit of the rectifiers intermediate the polarity maintaining resistors disposed to be directionally energized in response to an unbalanced potential across the output terminals thereof for regulating the electrical quantity, the electrical means having an impedance ranging from .2 to .4 times the impedance of the linear impedance circuit.

EDWIN L. HARDER.
HOMER M. RUSTEBAKKE.

REFERENCES CITED

The following references are of record in the file of this patent:

UNITED STATES PATENTS

| Number | Name | Date |
|---|---|---|
| 2,217,457 | Schmutz | Oct. 8, 1940 |